United States Patent
Oh et al.

(10) Patent No.: US 10,920,709 B2
(45) Date of Patent: Feb. 16, 2021

(54) APPARATUS AND METHOD FOR CONTROLLING ENVIRONMENT-FRIENDLY VEHICLE

(71) Applicants: Hyundai Motor Company, Seoul (KR); Kia Motors Corporation, Seoul (KR)

(72) Inventors: Hee Chang Oh, Suwon-si (KR); Yeong Seop Park, Seoul (KR); Kwan Hee Lee, Suwon-si (KR); Jong Hyeok Lee, Hwaseong-si (KR); Jae Gu Kang, Seoul (KR); Dong Hee Han, Seoul (KR); Seung Woo Hong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/535,875

(22) Filed: Aug. 8, 2019

(65) Prior Publication Data
US 2020/0284215 A1     Sep. 10, 2020

(30) Foreign Application Priority Data

Mar. 4, 2019   (KR) .......................... 10-2019-0024792

(51) Int. Cl.
| | |
|---|---|
| *F02D 41/30* | (2006.01) |
| *F02D 41/26* | (2006.01) |
| *F02D 41/14* | (2006.01) |

(52) U.S. Cl.
CPC ..... *F02D 41/3035* (2013.01); *F02D 41/1473* (2013.01); *F02D 41/26* (2013.01)

(58) Field of Classification Search
CPC ... F02D 41/3035; F02D 41/26; F02D 41/1473
See application file for complete search history.

(56) References Cited

U.S. PATENT DOCUMENTS

2007/0078586 A1* 4/2007 Pallett .................. B60W 10/26
701/101

* cited by examiner

*Primary Examiner* — Xiao En Mo
(74) *Attorney, Agent, or Firm* — Slater Matsil, LLP (57) ABSTRACT

An apparatus for controlling an environment-friendly vehicle, a system having the same, and a method thereof are provided. The apparatus includes a processor to perform a control operation to expand an operable area based on a motor efficiency gain and a state of charge (SOC) of a battery in an Homogeneous Charge Compression Ignition (HCCI) operation or a lean burn operation, and a storage to store the motor efficiency gain and the SOC of the battery, which are acquired by the processor.

20 Claims, 8 Drawing Sheets

APPARATUS AND METHOD FOR CONTROLLING ENVIRONMENT-FRIENDLY VEHICLE

CROSS-REFERENCE TO RELATED APPLICATIONS

This application claims priority to Korean Patent Application No. 10-2019-0024792, filed in the Korean Intellectual Property Office on Mar. 4, 2019, which application is hereby incorporated herein by reference.

TECHNICAL FIELD

The present disclosure relates to an apparatus and method for controlling an environment-friendly vehicle.

BACKGROUND

Figure 1:
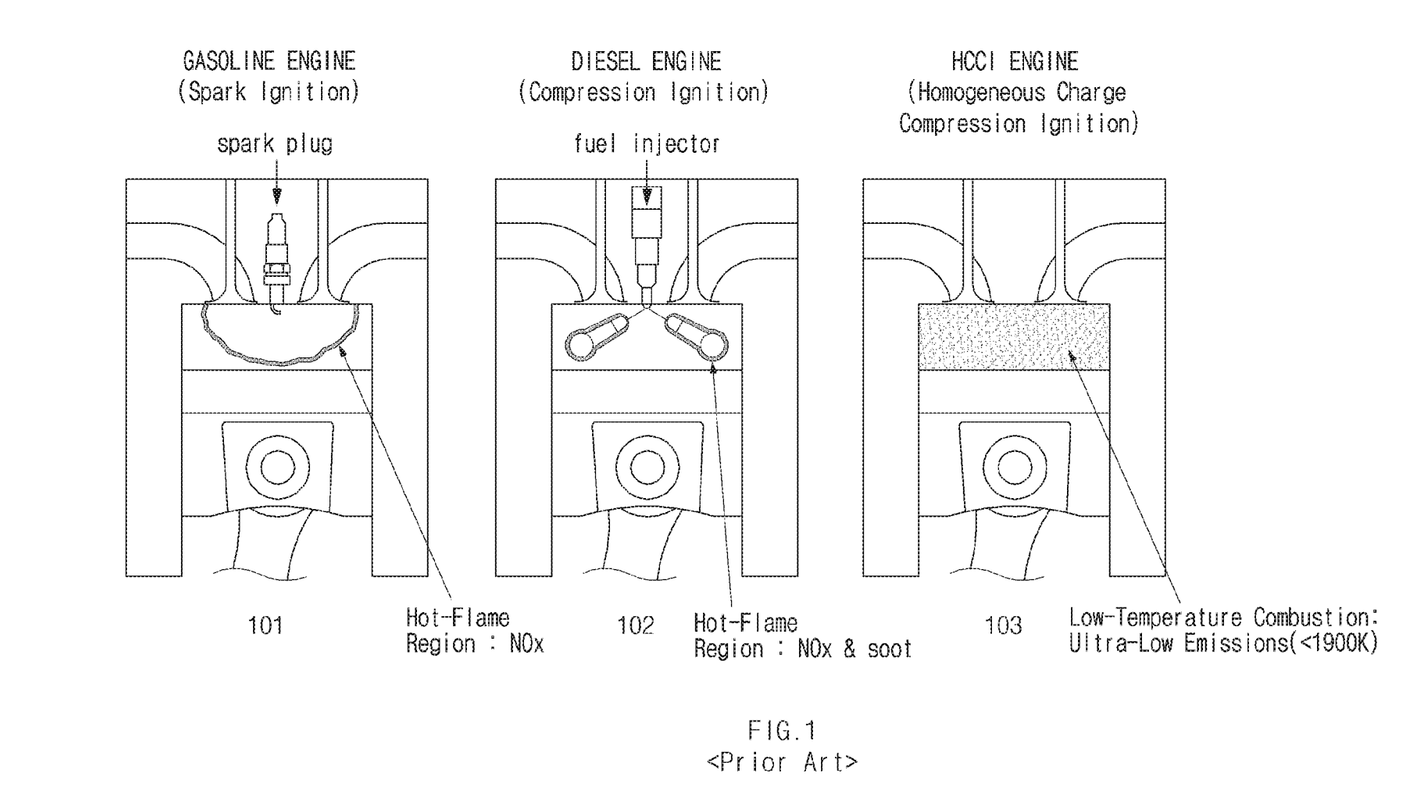
FIG. 1 is an illustration typical vehicle engines.

In FIG. 1, reference numeral 101 discloses a gasoline engine, reference numeral 102 discloses a diesel engine, and reference numeral 103 denotes a homogeneous charge compression ignition (HCCI) engine.

The gasoline engine 101 and the diesel engine 102 differ from each other in the combustion manner. The gasoline engine 101 causes combustion through an ignition process of compressing a homogeneous mixture of air and fuel for the gasoline engine 10 and using a spark produced by an electric ignition device. In this case, since the ignition timing of a spark ignition device is electrically controlled, it is easy to control the timing of combustion occurrence, and since the homogeneous mixture is burned, the soot caused due to the locally heavy composition may be small. The diesel engine 102 causes combustion through a compression ignition process by spraying fuel to air compressed at 15:1 or more. When the combustion is caused in a multipoint ignition scheme based on the compression ignition, the combustion stability is excellent, the combustion efficiency is improved, and the fuel consumption is improved together with the lean air fuel ratio composition of the diesel engine. However, soot is produced due to the heterogeneity of the mixture, and high nitrogen oxide is emitted under high temperature and pressure conditions.

The HCCI engine 103, which is developed based on the gasoline engine 101 and the diesel engine 102, employs a manner of rapidly combusting under a lower temperature condition through the compression ignition for a homogeneous mixture having a lean composition. In addition, a gasoline lean burn technology has been developed to ignite the homogeneous fuel-air mixture having the lean composition using high-energy spark by maximizing internal turbulent energy of a combustion chamber. Both of two combustion technologies have been developed to improve fuel consumption while maintaining low exhaust gas emission under middle and low load conditions.

However, an HCCI engine technique and a lean burn operation technique are limited in operable areas thereof.

In other words, in the HCCI engine control and the lean burn operation, combustion instability is caused, and stable operation is difficult in a low load. In a high load, combustion noise or nitrogen oxide emission increases, so operation is impossible. Therefore, the operation under the stoichiometric air-fuel ratio condition and the transition of the SI (spark ignition) mode are necessary outside the operable area. However, the mode transition shock and the loss in the fuel consumption may be caused.

SUMMARY

The present disclosure relates to an apparatus for controlling an environment-friendly vehicle, a system having the same, and a method thereof. Particular embodiments relate to a technology of expanding an operable area in lean burn operation or Homogeneous Charge Compression Ignition (HCCI) engine combustion operation.

Embodiments can solve above-mentioned problems occurring in the prior art while advantages achieved by the prior art are maintained intact.

An aspect of the present disclosure provides an apparatus for controlling an environment-friendly vehicle, capable of expanding an operable area to reduce vehicle fuel consumption when HCCI engine and lean burn operation techniques are applied in the environment-friendly vehicle, a system having the same, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure an apparatus for controlling an environment-friendly vehicle may include a processor to perform a control operation to expand an operable area based on a motor efficiency gain and a state of charge (SOC) of a battery in an Homogeneous Charge Compression Ignition (HCCI) operation or a lean burn operation, and a storage to store the motor efficiency gain and the SOC of the battery, which are acquired by the processor.

According to an embodiment, the processor may calculate engine request torque and motor request torque based on driver request torque, a driving condition, and the SOC of the battery.

According to an embodiment, the processor may determine whether an HCCI operation enabling condition is satisfied, based on at least one of whether a predetermined time period elapses after starting, whether there is present an operation state for a catalyst heating duration, a cooling water temperature, an oil temperature, an external temperature, and whether a system is abnormal based on diagnosis result of the system.

According to an embodiment, the processor may determine whether engine request torque satisfies a predetermined HCCI-operable area condition, when the HCCI operation enabling condition is satisfied.

According to an embodiment, the processor may perform HCCI operation control, when the engine request torque satisfies the predetermined HCCI-operable area condition.

According to an embodiment, the processor may determine whether the engine request torque is greater than an upper limit value of the HCCI-operable area or less than a lower limit value of the HCCI-operable area, when the engine request torque fails to satisfy the HCCI-operable area.

According to an embodiment, the processor may determine whether torque assist control and HCCI operation control are possible, when the engine request torque is greater than the upper limit value of the HCCI-operable area, and may determine whether power generation control and the HCCI operation control are possible, when the engine request torque is less than the lower limit value of the HCCI-operable area.

According to an embodiment, the processor may determine whether a torque assist enabling condition is satisfied based on a motor enabling condition, the SOC of the battery, and driver request torque, when the engine request torque is greater than the upper limit value of the HCCI-operable area.

According to an embodiment the motor enabling condition may include a normal battery temperature, a normal motor temperature, that any motor failure signal is not detected, and that any abnormal signal is not detected.

According to an embodiment, the processor may determine whether a torque assist and HCCI operation efficiency gain satisfies a predetermined condition, when the torque assist enabling condition is satisfied, and may perform torque assist control and HCCI operation control, when the torque assist and HCCI operation efficiency gain satisfies the predetermined condition.

According to an embodiment, the processor may change engine torque to the upper limit value of the HCCI-operable area and corrects motor torque by adding a value, which is obtained by subtracting the upper limit value of the HCCI-operable area from the engine request torque, to present motor torque to perform the torque assist control and HCCI operation control.

According to an embodiment, the processor may determine whether a power generation control enabling condition is satisfied, based on a motor enabling condition, the SOC of the battery, and driver request torque, when the engine request torque is less than the lower limit value of the HCCI-operable area.

According to an embodiment, the processor may determine whether a power generation control and HCCI operation efficiency gain satisfies a predetermined condition, when the power generation control enabling condition is satisfied, and may perform power generation control and HCCI operation control, when the power generation control and HCCI operation efficiency gain satisfies the predetermined condition.

According to an embodiment, the processor may change engine torque to the lower limit value of the HCCI-operable area, and correct motor torque by adding a value, which is obtained by subtracting the engine request torque from the lower limit value of the HCCI-operable area, to present motor torque to perform the power generation control and the HCCI operation control.

According to another aspect of the present disclosure, an environment-friendly vehicle system may include a motor to drive a vehicle based on battery energy, an engine to drive the vehicle through fuel combustion, and an environment-friendly vehicle control apparatus to perform a control operation to expand an operable area based on a motor efficiency gain and an SOC of a battery, when the engine is an HCCI engine or when the engine is an SI engine and performs a lean burn operation.

According to another aspect of the present disclosure, the method may include determining whether an operable area condition is satisfied in an HCCI operation or a lean burn operation, determining whether torque assist control or power generation control is possible, when the operable area condition is not satisfied, and performing a control operation to expand an operable area based on a motor efficiency gain and an SOC of a battery when torque assist control and the power generation control are possible.

According to an embodiment, the method may further include determining whether an HCCI operation enabling condition is satisfied, based on at least one of whether a predetermined time period elapses after starting, whether there is present an operation state for a catalyst heating duration, a cooling water temperature, an oil temperature, an external temperature, and whether a system is abnormal based on diagnosis result of the system.

According to an embodiment, the determining of whether the torque assist control or the power generation control is possible may include determining whether a torque assist enabling condition is satisfied based on a motor enabling condition, the SOC of the battery, and driver request torque, when engine request torque is greater than an upper limit value of an HCCI-operable area.

According to an embodiment, the determining of whether the torque assist control or the power generation control is possible may include determining whether a power generation control enabling condition is satisfied, based on a motor enabling condition, the SOC of the battery, and driver request torque, when engine request torque is less than a lower limit value of an HCCI-operable area.

According to an embodiment, the performing of the expanding the operable area may include determining whether a torque assist and HCCI operation efficiency gain satisfies a predetermined condition, when the torque assist enabling condition is satisfied, and performing torque assist control and HCCI operation control when the torque assist and HCCI operation efficiency gain satisfies the predetermined condition.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure is applicable to a technology capable of expanding the operable area to reduce the vehicle fuel consumption, when the HCCI engine or lean burn operation technique is applied to an environment-friendly vehicle.

Hereinafter, embodiments of the present disclosure will be described in detail with reference to FIG. 2 to FIG. 8.

Figure 2:
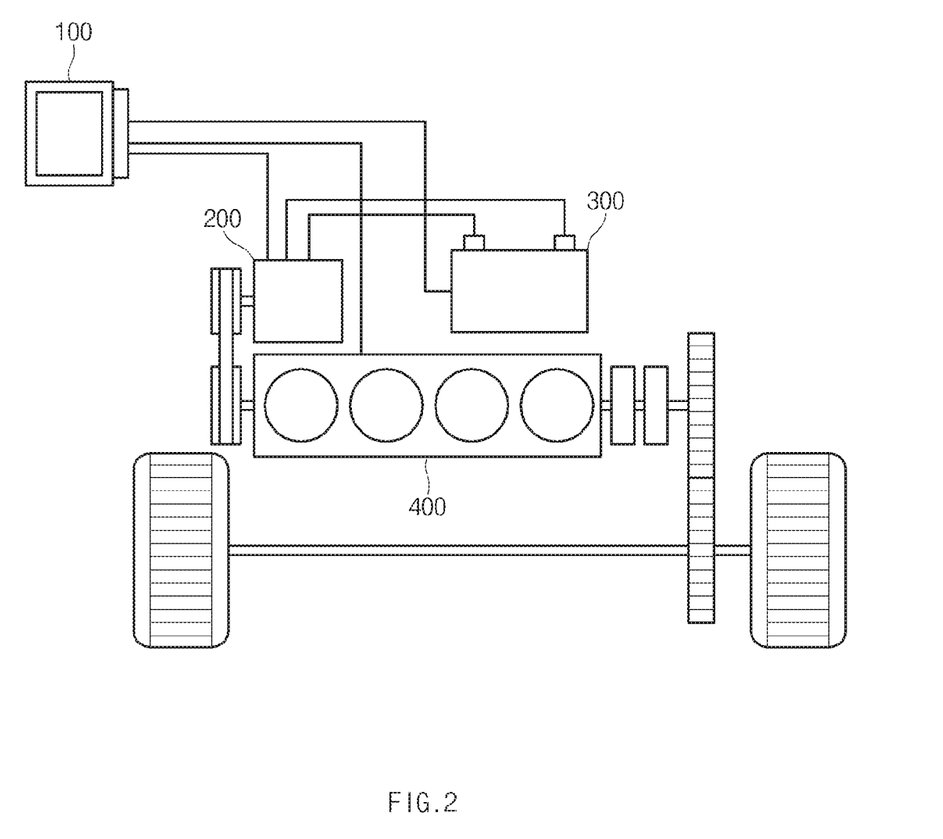
FIG. 2 is a block diagram illustrating the configuration of an environment-friendly vehicle system including an environment-friendly vehicle control apparatus, according to an embodiment of the present disclosure.
Figure 3:
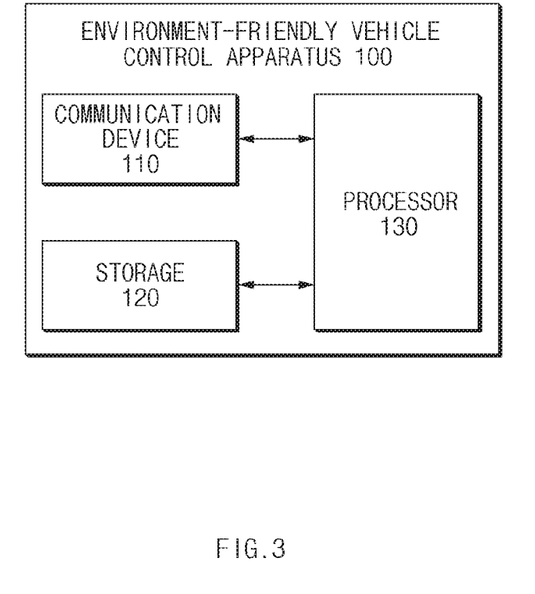
FIG. 3 is a view illustrating the detailed configuration of the environment-friendly vehicle control apparatus, according to an embodiment of the present disclosure.
Figure 4:
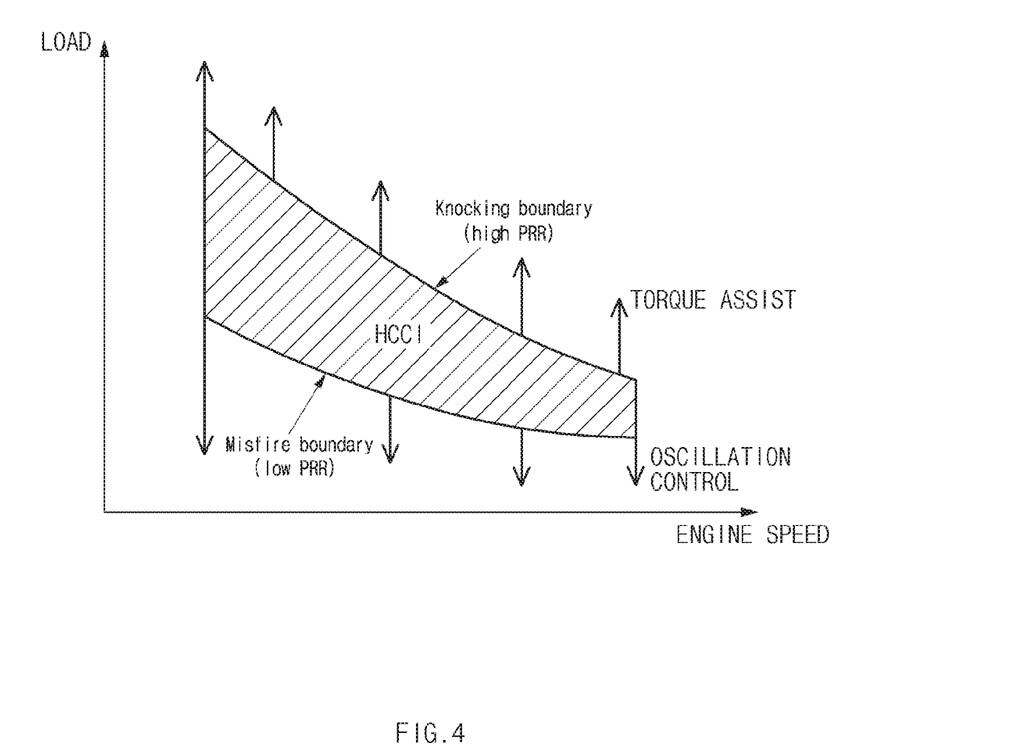
FIG. 4 is a graph illustrating an HCCI-operable area of the environment-friendly vehicle, according to an embodiment of the present disclosure.

FIG. 2 is a block diagram illustrating the configuration of an environment-friendly vehicle system including an environment-friendly vehicle control apparatus, according to an embodiment of the present disclosure, and FIG. 3 is a view illustrating the detailed configuration of the environment-friendly vehicle control apparatus, according to an embodiment of the present disclosure.

Referring to FIG. 2, a vehicle system according to an embodiment of the present disclosure may include an apparatus (hereinafter, referred to as "environment-friendly vehicle control apparatus) 100 for controlling an environment-friendly vehicle, a motor 200, a battery system 300, and an engine 400. The environment-friendly vehicle system of the present disclosure may further include a hybrid starter and generator (HSG), an engine clutch, and a transmission.

The motor 200 drives the vehicle using the energy of the battery system 300 and operates as a power generator in costing driving to supply regenerative energy to the battery system 300.

The battery system 300 includes a battery having a plurality of unit cells. When the voltage of the battery is applied to the motor 200, the motor 200 may be driven.

The engine 400 may be implemented with a homogeneous charge compression ignition (HCCI) engine, a spark ignition (SI) engine, or the like, to drive the vehicle by burning fuel. The HCCI engine is a type of an engine that uses gasoline fuel, and compresses and ignites lean homogeneous mixture of air and fuel.

In the environment-friendly vehicle control apparatus 100, the operable area may be expanded and applied may be applied in the HCCI engine combustion or the lean burn operation.

Referring to FIG. 3, the environment-friendly vehicle control apparatus 100 may include a communication device 110, a storage 120, and a processor 130.

The communication device no is a hardware device implemented with various electronic circuits to transmit and receive a signal through a wireless or wired connection. In the present disclosure, the communication device no may make in-vehicle network through controller area network (CAN) communication or local interconnect network (LIN) communication.

The storage 120 may store the information on engine request torque, an HCCI-operable area, or the like, a motor efficiency gain, and the SOC of the battery, which are obtained by the processor 130. The storage 120 may include at least one storage medium among a flash type memory, a hard disk type memory, a micro type memory, a card (e.g., a secure digital (SD) card, or an eXtream digital card) type memory, a random access memory (RAM), a Static Random Access Memory (SRAM), a Read Only Memory (ROM), a Programmable Read Only Memory (PROM), an Electrically Erasable and Programmable ROM (EEPROM), a magnetic RAM (MRAM), a magnetic disk type memory, and an optical disk type memory.

The processor 130 may be electrically connected with the communication device 110, the storage 120, and the like, may electrically control each component, and may be an electric circuit to execute a command of the software. Various data processing and computing operations to be described below may be performed.

The processor 130 may perform a control operation to expand the operable area based on the motor efficiency gain and the state of charge (SOC) of a battery in the HCCI operation or the lean burn operation.

The processor 130 may calculate engine request torque and motor request torque based on driver request torque, a driving condition, and the SOC of the battery.

The processor 130 determines whether an HCCI operation enabling condition is satisfied, based on at least one of whether a predetermined time period elapses after starting, whether there is an operation for the catalyst heating duration, a cooling water temperature, an oil temperature, an external temperature, and whether a system is abnormal based on diagnosis result of the system.

When the HCCI operation enabling condition is satisfied, the processor 130 may determine whether the engine request torque satisfies a predetermined HCCI-operable area condition. In other words, the processor 130 may perform HCCI operation control when the engine request torque satisfies the HCCI-operable area.

When the engine request torque fails to satisfy the HCCI-operable area, the processor 130 determines whether the engine request torque is greater than the upper limit value of the HCCI-operable area or less than the lower limit value of the HCCI-operable area.

The processor 130 determines whether torque assist control and HCCI operation control are possible, when the engine request torque is greater than the upper limit value of the HCCI-operable area. When the engine request torque is less than the lower limit value of the HCCI-operable area, the processor 130 determines whether power generation control and the HCCI operation control are possible. In this case, the power generation control technique is a battery charge control technique, in which the motor may serve as a power generator to charge the battery by producing electric energy using a portion of the engine power. In addition, the torque assist control technique is a battery discharge control technique, in which the motor assists the torque and consumes battery power to add additional power to the engine power.

The processor 130 may determine whether a torque assist enabling condition is satisfied based on a motor enabling condition, the SOC of the battery, and the driver request torque, when the engine request torque is greater than the upper limit value of the HCCI-operable area.

In this case, the motor enabling condition may include a normal battery temperature, a normal motor temperature, that any motor failure signal is not detected, and that any abnormal signal is not detected.

When the torque assist enabling condition is satisfied, the processor 130 determines whether a torque assist and the HCCI operation efficiency gain satisfies a predetermined condition. When the torque assist and HCCI operation efficiency gain satisfies the predetermined condition, torque assist control and HCCI operation control may be performed.

The processor 130 may change the engine torque to the upper limit value of the HCCI-operable area and may correct the motor torque by adding the value, which is obtained by subtracting the upper limit value of the HCCI-operable area from the engine request torque, to present motor torque to perform torque assist control and HCCI operation control.

When the engine request torque is less than the lower limit value of the HCCI-operable area, the processor 130 may determine whether a power generation control enabling condition is satisfied, based on the motor enabling condition, the SOC of the battery, and the driver request torque.

The processor 130 determines whether a power generation control and HCCI operation efficiency gain satisfy a predetermined condition when the power generation control enabling condition is satisfied, and when the power generation control and HCCI operation efficiency gain satisfies the predetermined condition, the processor 130 may perform power generation control and HCCI operation control.

The processor 130 may change the engine torque to the lower limit value of the HCCI-operable area, and may correct the motor torque by adding the value, which is obtained by subtracting the engine request torque from the lower limit value of the HCCI-operable area, to the present motor torque to perform the power generation control and the HCCI operation control.

The processor 130 may determine whether the efficiency gain in the torque assist control is satisfied as in following Equation 1, and may determine whether the efficiency gain in the power generation control is satisfied, as in the following Equation 2.

$$\frac{P_{eng,HCCI} - P_{mot}}{m_{HCCI}LHV + P_{mot}\eta_{mot}} > \frac{P_{eng,\lambda=1}}{m_{\lambda=1}LHV} \quad \text{[Equation 1]}$$

The left side of Equation 1 is the system efficiency when the HCCI-operable area in the torque assist control is expanded, and the right side is the engine efficiency in the SI operation.

$$\frac{P_{eng,HCCI} + P_{mot}}{m_{HCCI}LHV + P_{mot}\eta_{mot}} > \frac{P_{eng,\lambda=1}}{m_{\lambda=1}LHV} \quad \text{[Equation 2]}$$

The left side of Equation 2 is the system efficiency when the HCCI-operable area in power generation control is expanded, and the right side is the engine efficiency in SI operation.

The meaning of each variable in Equations 1 and 2 and the description of the applied values are shown in Table 1 below.

TABLE 1

| Signs | Meanings | Application of Equation 1 | Application of Equation 2 |
|---|---|---|---|
| $P_{eng,HCCI}$ | Engine power in HCCI operation mode | Engine power at $T_{high,HCCI}$ | Engine power at $T_{low,HCCI}$ |

TABLE 1-continued

| Signs | Meanings | Application of Equation 1 | Application of Equation 2 |
|---|---|---|---|
| LHV | Fuel calorific value (low heating value) | Constant (42.7 MJ/kg) | Constant |
| $P_{mot}$ | Power of motor for expanding HCCI | Motor power at $T_{eng}$-$T_{high,HCCI}$ | Motor power at $T_{low,HCCI}$-$T_{eng}$ |
| $P_{eng,\lambda=1}$ | Engine power in SI operation mode at $\lambda=1$ | Engine power at $T_{eng}$ | Engine power at $T_{eng}$ |
| $m_{\lambda=1}$ | Fuel consumption ratio in SI operation mode at $\lambda=1$ | Fuel consumption ratio at $T_{eng}$ | Fuel consumption ratio at $T_{eng}$ |
| $m_{HCCI}$ | Fuel consumption ratio in HCCI operation mode | Fuel consumption ratio at $T_{high,HCCI}$ | Fuel consumption ratio at $T_{low,HCCI}$ |
| $\eta_{mot}$ | Efficiency of motor at relevant operation point | Efficiency at $T_{driv}$-$T_{high,HCCI}$ | Efficiency at $T_{low,HCCI}$-$T_{driv}$ |

As described above, according to the present disclosure, the torque assist control or the power generation control may be performed and the HCCI operation or the SI operation control may be performed, based on the SOC of the battery when the driver request torque deviates from the HCCI-operable area in HCCI operation or SI lean burn operation, thereby expanding the HCCI-operable area. Accordingly, it is possible to increase the low fuel consumption operable area and to reduce unnecessary mode conversion, thereby further reducing the vehicle fuel consumption.

In other words, although the lean burn operation technique may increase the air-fuel ratio by leaning the gasoline, the operable area is limited, and the stoichiometric air-fuel ratio condition SI and mode conversion are required outside the operation range. In the mode transition and the stoichiometric air-fuel ratio operation, a transition shock and fuel consumption loss may be caused. Therefore, in the present disclosure, it is possible to further reduce the vehicle fuel consumption by reducing unnecessary mode transition.

Figure 5:
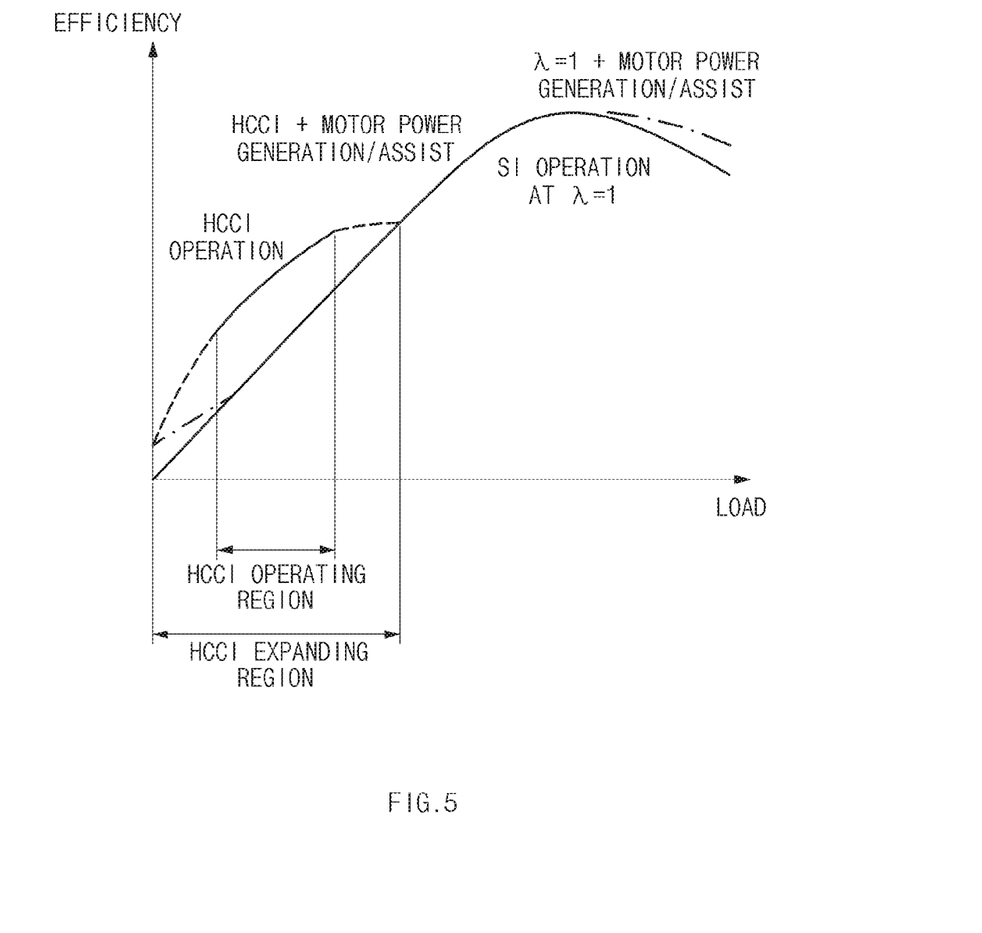
FIG. 5 is a graph illustrating a method for expanding an HCCI-operable area of the vehicle, according to an embodiment of the present disclosure.

FIG. 5 is a graph illustrating the HCCI-operable area of then environment-friendly vehicle according to an exemplary embodiment of the present disclosure, in which the torque assist control is performed in a high load area out of the HCCI-operable area, and the power generation control is performed in a low load area out of the HCCI-operable area.

Figure 6:
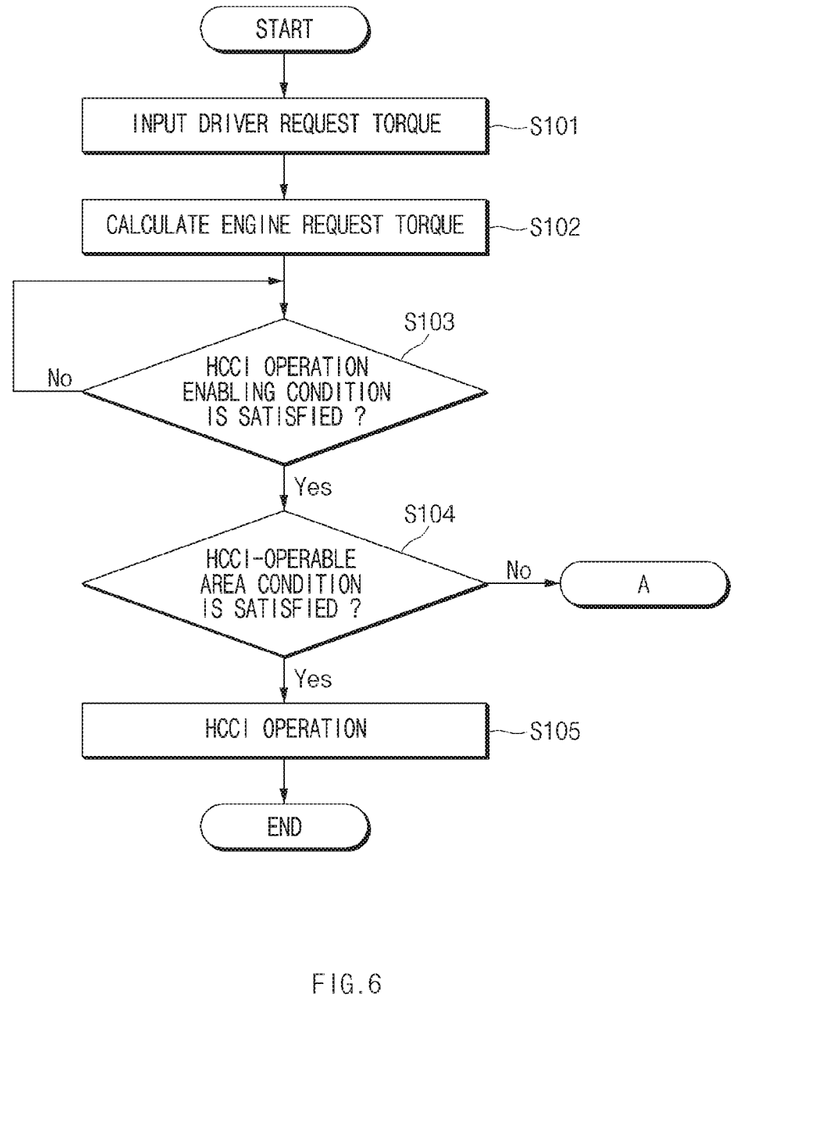
FIG. 6 is a flowchart illustrating an HCCI operation control method for the environment-friendly vehicle, according to an embodiment of the present disclosure.

FIG. 6 is a graph illustrating a method of expanding the HCCI-operable area of the vehicle according to an embodiment of the present disclosure. Referring to FIG. 6, the HCCI-operable area is expanded, based on the load and efficiency.

Figure 7:
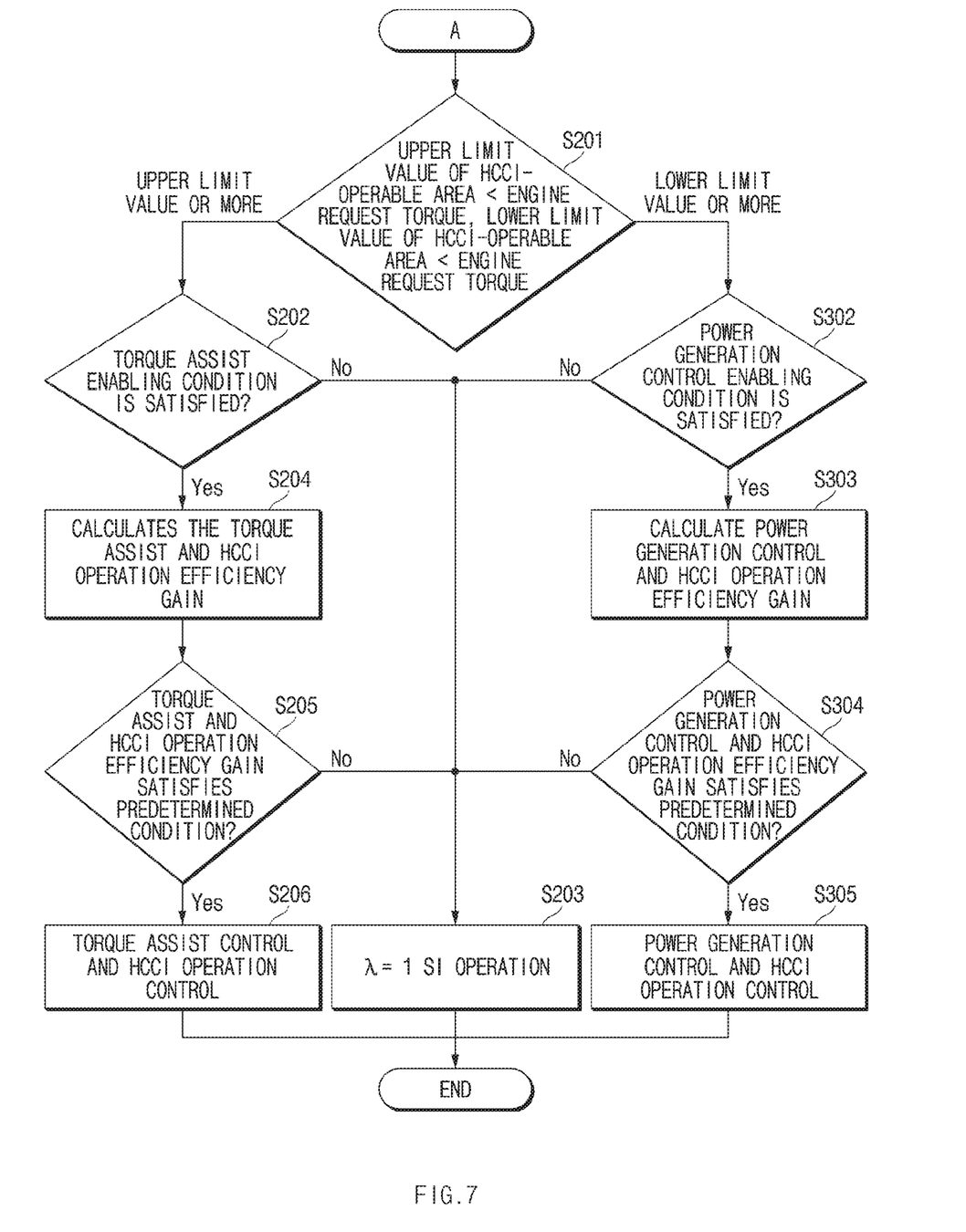
FIG. 7 is a flowchart illustrating a method for controlling the expanding of the operable area in the environment-friendly vehicle according to an embodiment of the present disclosure.

Hereinafter, a method for controlling an environment-friendly vehicle according to an embodiment of the present disclosure will be described in detail with reference to FIGS. 6 and 7. FIG. 6 is a flowchart illustrating the HCCI operation control method of the environment-friendly vehicle according to an embodiment of the present disclosure, and FIG. 7 is a flowchart illustrating a method for controlling the expanding of the operable area in an environment-friendly vehicle according to an embodiment of the present disclosure.

Hereinafter, it is assumed that the environment-friendly vehicle control apparatus 100 of FIG. 2 performs the processes of FIGS. 6 and 7. In addition, in the following description to be made with reference FIGS. 6 and 7, it may be understood that the operations described as being performed by an apparatus is controlled by the processor 130 of the environment-friendly vehicle control apparatus 100.

Referring to FIG. 6, when the driver request torque is input (S101), the environment-friendly vehicle control apparatus 100 calculates the engine request torque (S102). In this case, the environment-friendly vehicle control apparatus 100 determines the operating conditions of the engine and the motor based on the SOC and the driving condition (e.g., a road gradient, a road environment, a driver tendency, a vehicle speed, or the like), and an environmental condition (an external temperature, an engine temperature, a battery temperature, an altitude, or the like) and may calculate the engine request torque $T_{eng}$. Further, the environment-friendly vehicle control apparatus 100 may calculate the motor request torque based on the operating conditions of the engine and the motor and the driver request torque.

Then, the environment-friendly vehicle control apparatus 100 determines whether the HCCI operation enabling condition is satisfied (S103). In other words, the environment-friendly vehicle control apparatus 100 checks whether a predetermined time period elapses after starting, whether a present condition is the special operation condition such as the catalyst heating duration, whether a cooling water temperature, an oil temperature, or an external temperature is in a proper range, and whether system diagnosis is abnormal. When the predetermined time period elapses after starting, when the present condition is not the special operation condition such as the catalyst heating duration, when the cooling water temperature, the oil temperature, or the external temperature is in the proper range, when the system diagnosis is not abnormal, the environment-friendly vehicle control apparatus 100 determines the HCCI operation enabling condition as being satisfied.

When the HCCI operation enabling condition is satisfied, the environment-friendly vehicle control apparatus 100 determines whether the HCCI-operable area condition is satisfied (S104).

The environment-friendly vehicle control apparatus 100 determines whether the engine request torque $T_{eng}$ is in a range ($T_{low,HCCI} < T_{eng} < T_{high,HCCI}$) between the predetermined lower limit value ($T_{low,HCCI}$) and the predetermine upper limit value ($T_{high,HCCI}$) of the operable area. When the engine request torque ($T_{eng}$) satisfies the range, the environment-friendly vehicle control apparatus 100 may determine the HCCI-operable area condition as being satisfied. In this case, the predetermined lower limit value ($T_{low,HCCI}$) and the predetermine upper limit value ($T_{high,HCCI}$) of the operable area may be defined in advance as functions of an RPM and a cooling water temperature, and may be determined depending on HEV/MHEV control logic.

When the HCCI-operable area condition is satisfied, the environment-friendly vehicle control apparatus 100 may perform the HCCI operation (S105). Meanwhile, when the HCCI-operable area condition is not satisfied in step S104, the HCCI-operable area is expanded to perform the torque assist control and HCCI (compression ignition) operation, or spark ignition (SI), or the power control and HCCI operation as illustrated in FIG. 7.

Referring to FIG. 7, the environment-friendly vehicle control apparatus 100 determines whether the engine request torque is greater than the predetermined upper limit value of the HCCI-operable area and whether the engine request torque is less than a predetermined lower limit value of the HCCI-operable area (S201).

When the engine request torque is greater than the predetermined upper limit value of the HCCI-operable area, the environment-friendly vehicle control apparatus 100 determines whether the torque assist enabling condition is satisfied (S202).

In an environment-friendly vehicle such as HEV/MHEV, when the battery needs to be charged based on the SOC (when the SOC is lower than the reference value), the engine is operated at an engine request torque higher than the driver request torque, and when the power of the battery is sufficient (when the SOC is higher than the reference value), the engine is operated at the engine request torque lower than the driver request torque and the insufficient torque is complemented by the assist of the motor.

In this case, the torque assist enabling condition may include the cases in which the motor is an operable state, the SOC is greater than the lower limit value ($SOC_{thd, low}$) of the SOC, and a value, which is obtained by subtracting the HCCI torque ($T_{high,HCCI}$) from the driver request torque ($T_{driv}$), is less than the assist limit torque of the motor, which is a set value. In this case, the state in which the motor is in the operable state means a state in which the battery and motor temperatures are normal, and fault and abnormality signals are not detected. In this case, the lower limit value ($SOC_{thd, low}$) of the SOC may be calculated based on a driving condition (the vehicle speed or the road gradient) condition, the external condition (the altitude or the external air temperature), or a battery condition (temperature).

When the torque assist enabling condition is not satisfied, the environment-friendly vehicle control apparatus 100 performs the SI operation control at the stoichiometric air-fuel ratio (λ32 1) (S203). The stoichiometric air-fuel ratio refers to the mixing ratio of air and fuel to completely burn oxygen and fuel.

Meanwhile, when the torque assist enabling condition is satisfied in operation S202, the environment-friendly vehicle control apparatus 100 calculates the torque assist and HCCI operation efficiency gain (S204).

When the torque assist and HCCI operation efficiency gain satisfies the predetermined condition (S205), the environment-friendly vehicle control apparatus 100 performs the torque assist control and HCCI operation control (S206). In this case, the environment-friendly vehicle control apparatus 100 changes the engine torque to the upper limit value ($T_{high,HCCI}$) of the HCCI-operable area and corrects the motor torque by adding a value ($T_{eng}-T_{high,HCCI}$), which is obtained by subtracting the upper limit value of the HCCI-operable area from the engine request torque, to an existing value.

Meanwhile, when the torque assist and HCCI operation efficiency gain fails to satisfy the predetermined condition, the environment-friendly vehicle control apparatus 100 performs the SI operation control at the stoichiometric air-fuel ratio (λ32 1) (S203).

Meanwhile, when the engine request torque is less than the predetermined lower limit value of the HCCI-operable area in operation S201, the environment-friendly vehicle control apparatus 100 determines whether the power generation control enabling condition is satisfied (S302).

In this case, the power generation control enabling condition may include that the motor is in the operable state, the SOC is higher than the upper limit value of the SOC, and the value, which is obtained by subtracting the driver request torque from the lower limit value ($T_{low,HCCI}$) of the HCCI is less than power generation limit torque of the motor.

In this case, the upper limit value ($SOC_{thd, high}$) of the SOC may be calculated based on the driving condition (the vehicle speed or the road gradient) condition, the external condition (the altitude or the external air temperature), or the battery condition (temperature).

When the power generation control enabling condition is not satisfied, the environment-friendly vehicle control apparatus 100 performs the SI operation control at the stoichiometric air-fuel ratio (λ32 1) (S203).

Meanwhile, when the power generation control enabling condition is satisfied in operation S302, the environment-friendly vehicle control apparatus 100 calculates the power generation control and HCCI operation efficiency gain (S303).

When the power generation control and HCCI operation efficiency gain satisfies a predetermined condition (S304), the environment-friendly vehicle control apparatus 100 performs power generation control and HCCI operation control (S305). In this case, the environment-friendly vehicle control apparatus 100 changes the engine torque to the lower limit value ($T_{low,HCCI}$) of the HCCI-operable area, and corrects the motor torque by adding a value ($T_{low,HCCI}$- $T_{eng}$), which is obtained by subtracting the engine request torque from the lower limit value of the HCCI-operable area, to the existing value.

Meanwhile, when the power generation control and the HCCI operation efficiency gain fails to satisfy the predetermined condition, the environment-friendly vehicle control apparatus 100 performs the SI operation control at the stoichiometric air-fuel ratio (λ32 1) (S203).

Although FIGS. 6 and 7 illustrate only an example of expanding the HCCI-operable area, an operable area may be expanded and applied even in the lean burn operation based on the SI engine as illustrated in FIGS. 6 and 7.

In HCCI engine combustion, operation is impossible due to misfire and combustion instability in a low load area, and is impossible due to knocking in a high load area. In addition, in homogeneous and stratified lean burn operation, operation is impossible due to combustion instability in the low load area, and is impossible due to increase in NOx emission in the high load area.

Therefore, according the present disclosure, the operable area is expanded based on the efficiency depending on the motor load and the SOC of the battery by using a motor connected with the engine of the environment-friendly vehicle in the HCCI engine combustion or the lean burn operation, thereby increasing low fuel consumption duration and minimizing the transition between the HCCI engine mode and the SI mode, so the fuel consumption of the vehicle may be more reduced.

In other words, in environment-friendly vehicles such as HEV and MHEV, when a SI engine technology of applying the stoichiometric air-fuel ratio combustion and of applying the HCCI operation or lean air-fuel ratio burn under some operation conditions is employed, and when the engine load required from the driver or EMS deviates from the operable area corresponding to the stoichiometric air-fuel ratio condition of HCCI operation or lean burn operation, HCCI operation or lean burn operation may be performed through power generation control or torque assist control of a motor based on the efficiency gain resulting from the motor load and the SOC of the battery.

Figure 8:
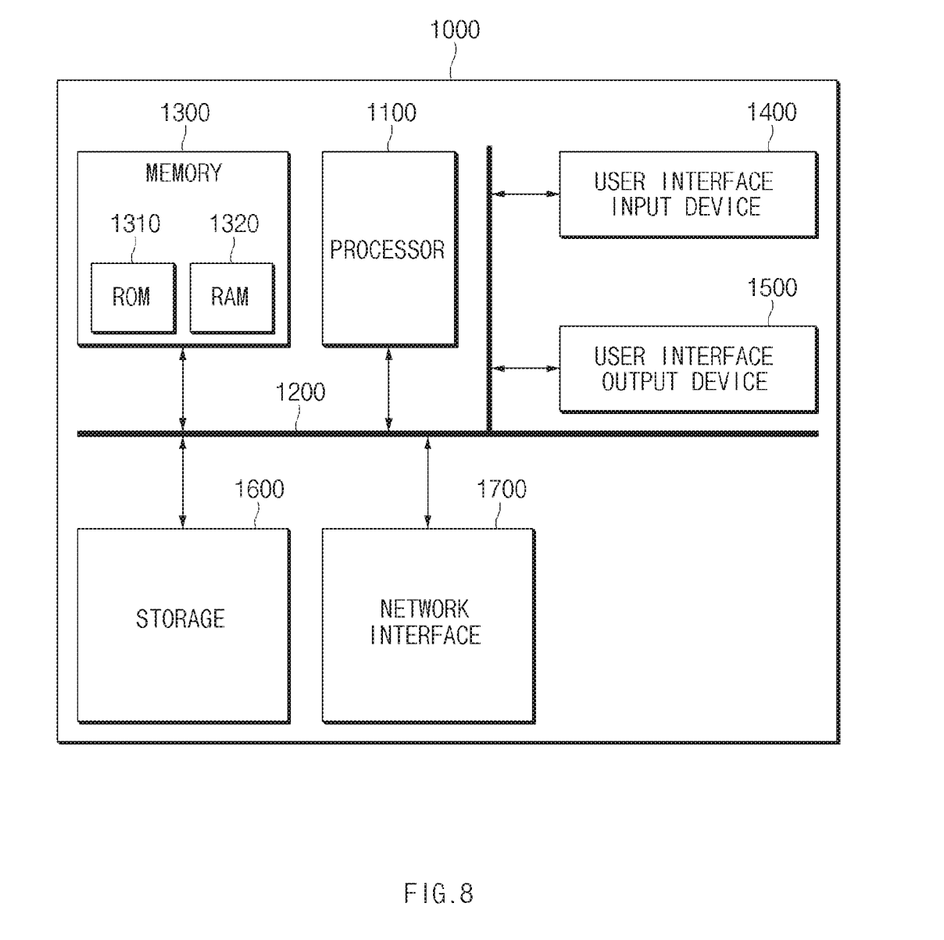
FIG. 8 illustrates a computing system according to an embodiment of the present disclosure.

FIG. 8 illustrates a computing system according to an embodiment of the present disclosure.

Referring to FIG. 8, a computing system woo may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination of two thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the present disclosure, in the environment-friendly vehicle, when the HCCI engine combustion operation technique or the lean burn operation technique are applied, the operable area may be expanded to reduce the vehicle fuel consumption.

Besides, a variety of effects directly or indirectly understood through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for controlling an environment-friendly vehicle, the apparatus comprising:
a processor configured to execute an algorithm to perform a control operation of an engine to expand an Homogeneous Charge Compression Ignition (HCCI)-operable area based on a state of charge (SOC) of a battery in an HCCI operation or a lean burn operation; and
a storage coupled to the processor and configured to store the algorithm such that execution of the algorithm by the processor causes the processor to:
control the engine to operate in the HCCI-operable area by expanding a high load area of the HCCI-operable area by performing torque assist control and HCCI operation control when the SOC of the battery is more than a predetermined reference value and a torque assist and a gain in efficiency of HCCI operation of the engine satisfies a predetermined condition, and control the engine to operate in the HCCI-operable area by expanding a low load area of the HCCI-operable area by performing power generation control and HCCI operation control when the SOC of the battery is less than the predetermined reference value and the power generation control and the gain in efficiency of HCCI operation satisfies the predetermined condition.

2. The apparatus of claim 1, wherein the execution of the algorithm causes the processor to calculate engine request torque and motor request torque based on driver request torque, a driving condition, and the SOC of the battery.

3. The apparatus of claim 1, wherein the execution of the algorithm causes the processor to determine whether an HCCI operation enabling condition is satisfied, based on at least one of whether a predetermined time period elapses after starting, whether there is present an operation state for a catalyst heating duration, a cooling water temperature, an oil temperature, an external temperature, or whether a system is abnormal based on diagnosis result of the system.

4. The apparatus of claim 1, wherein the execution of the algorithm causes the processor to determine whether engine request torque satisfies a predetermined HCCI-operable area condition when the predetermined condition is satisfied.

5. The apparatus of claim 4, wherein the execution of the algorithm causes the processor to perform the HCCI operation control when the engine request torque satisfies the predetermined HCCI-operable area condition.

6. The apparatus of claim 4, wherein the execution of the algorithm causes the processor to determine whether the engine request torque is greater than an upper limit value of the HCCI-operable area or less than a lower limit value of the HCCI-operable area when the engine request torque fails to satisfy the HCCI-operable area.

7. The apparatus of claim 6, wherein the execution of the algorithm causes the processor to:
determine whether torque assist control and HCCI operation control are possible when the engine request torque is greater than the upper limit value of the HCCI-operable area; and
determine whether power generation control and the HCCI operation control are possible when the engine request torque is less than the lower limit value of the HCCI-operable area.

8. The apparatus of claim 7, wherein the execution of the algorithm causes the processor to determine whether a torque assist enabling condition is satisfied based on a motor enabling condition, the SOC of the battery, and driver request torque, when the engine request torque is greater than the upper limit value of the HCCI-operable area.

9. The apparatus of claim 8, wherein the motor enabling condition comprises a normal battery temperature, a normal motor temperature, that any motor failure signal is not detected, and that any abnormal signal is not detected.

10. The apparatus of claim 8, wherein the execution of the algorithm causes the processor to determine whether a torque assist and HCCI operation efficiency gain satisfies a predetermined condition when the torque assist enabling condition is satisfied.

11. The apparatus of claim 10, wherein the execution of the algorithm causes the processor to change engine torque to the upper limit value of the HCCI-operable area and corrects motor torque by adding a value, which is obtained by subtracting the upper limit value of the HCCI-operable area from the engine request torque, to present motor torque to perform the torque assist control and HCCI operation control.

12. The apparatus of claim 7, wherein the execution of the algorithm causes the processor to determine whether a power generation control enabling condition is satisfied based on a motor enabling condition, the SOC of the battery, and driver request torque, when the engine request torque is less than the lower limit value of the HCCI-operable area.

13. The apparatus of claim 12, wherein the execution of the algorithm causes the processor to determine whether a power generation control and HCCI operation efficiency gain satisfies a predetermined condition when the power generation control enabling condition is satisfied.

14. The apparatus of claim 13, wherein the execution of the algorithm causes the processor to change engine torque to the lower limit value of the HCCI-operable area, and to correct motor torque by adding a value, which is obtained by subtracting the engine request torque from the lower limit value of the HCCI-operable area, to present motor torque to perform the power generation control and the HCCI operation control.

15. An environment-friendly vehicle system comprising:
a motor configured to drive a vehicle based on battery energy;
an engine configured to drive the vehicle through fuel combustion; and
an environment-friendly vehicle control apparatus configured to perform a control operation to expand an Homogeneous Charge Compression Ignition (HCCI) operable area based on a state of charge of a battery when the engine performs HCCI engine operation or a SI (spark ignition) engine lean burn operation, wherein the environment-friendly vehicle control apparatus is configured to:
control the engine to operate in the HCCI-operable area by expanding a high load area of the HCCI-operable area and by performing torque assist control and HCCI operation control when the state of charge of the battery is more than a predetermined reference value and a torque assist and a gain in efficiency of HCCI operation satisfies a predetermined condition; and
control the engine to operate in the HCCI-operable area by expanding a low load area of the HCCI-operable area and by performing power generation control and HCCI operation control when the state of charge of the battery is less than the predetermined reference value and the power generation control and the gain in efficiency of HCCI operation efficiency gain satisfies the predetermined condition.

16. A method for controlling an environment-friendly vehicle, the method comprising:
determining whether an operable area condition is satisfied in a Homogeneous Charge Compression Ignition (HCCI) operation or a lean burn operation;
determining whether torque assist control or power generation control is possible when the operable area condition is not satisfied; and
performing a control operation to expand an operable area based on a state of charge (SOC) of a battery when torque assist control and the power generation control are possible, wherein performing the control operation to expand the operable area comprises:
controlling an engine to operate in an HCCI-operable area by expanding a high load area of the HCCI-operable area by performing torque assist control and HCCI operation control when the SOC of the battery is more than a predetermined reference value and a torque assist and efficiency gain of HCCI operation satisfies a predetermined condition; and controlling the engine to operate in the HCCI-operable area by expanding a low load area of the HCCI-operable area by performing power generation control and HCCI operation control when the SOC of the battery is less than the predetermined reference value and the power generation control and the efficiency gain of HCCI operation satisfies the predetermined condition.

17. The method of claim 16, further comprising determining whether an HCCI operation enabling condition is satisfied based on at least one of whether a predetermined time period elapses after starting, whether there is present an operation state for a catalyst heating duration, a cooling water temperature, an oil temperature, an external temperature, or whether a system is abnormal based on diagnosis result of the system.

18. The method of claim 16, wherein determining whether the torque assist control or the power generation control is possible comprises:

determining whether a torque assist enabling condition is satisfied based on a motor enabling condition, the SOC of the battery, and driver request torque, when engine request torque is greater than an upper limit value of the HCCI-operable area; and determining whether a power generation control enabling condition is satisfied, based on the motor enabling condition, the SOC of the battery, and the driver request torque, when the engine request torque is less than a lower limit value of the HCCI-operable area.

19. The method of claim 18, wherein performing the control operation to expand the HCCI-operable area comprises determining whether the torque assist control is possible and the gain in HCCI operation efficiency satisfies a predetermined condition when the torque assist enabling condition is satisfied.

20. The apparatus of claim 1, wherein the gain in HCCI operation efficiency in an HCCI operation mode is calculated based on engine power, a fuel calorific value, and motor power for expanding the HCCI-operable area.

* * * * *